(12) United States Patent
Chiang et al.

(10) Patent No.: US 7,889,491 B2
(45) Date of Patent: Feb. 15, 2011

(54) SHOCKPROOFING MODULE AND ASSEMBLY OF THE SHOCKPROOFING MODULE AND AN ELECTRONIC DEVICE CARRIER CASE

(75) Inventors: Shun-Quan Chiang, Taipei Hsien (TW); Ming-Hui Kao, Taipei Hsien (TW)

(73) Assignee: Wistron Corporation, Taipei (TW)

( * ) Notice: Subject to any disclaimer, the term of this patent is extended or adjusted under 35 U.S.C. 154(b) by 111 days.

(21) Appl. No.: 12/432,363

(22) Filed: Apr. 29, 2009

(65) Prior Publication Data

US 2010/0039766 A1 Feb. 18, 2010

(51) Int. Cl.
G06F 1/16 (2006.01)
(52) U.S. Cl. ............... 361/679.34; 362/277; 280/86.75; 248/166
(58) Field of Classification Search ............ 701/1, 701/45; 248/55, 49, 166; 180/273, 291; 280/483, 735, 86.75, 250.1; 362/190, 266, 362/277; 361/679.34, 679.06, 679.56, 679.21, 361/679.27
See application file for complete search history.

(56) References Cited

U.S. PATENT DOCUMENTS 7,688,577 B2 * 3/2010 Wang ............... 361/679.35
2008/0037212 A1 * 2/2008 Wang ............... 361/685

* cited by examiner

Primary Examiner—Hung V Duong
(74) Attorney, Agent, or Firm—Turocy & Watson, LLP

(57) ABSTRACT

An assembly of a shockproofing module and an electronic device carrier case includes an electronic device carrier case and a plurality of shockproofing modules. The electronic device carrier case has two side walls spaced apart from each other, and each of the side walls is formed with at least one hole. Each shockproofing module is disposed at a respective one of the holes in the side walls, and includes a shockproofing washer and a pin component. The shockproofing washer is disposed at the respective one of the holes in the side walls, and the pin component is extended into the shockproofing washer and causes a part of the shockproofing washer to expand in radial directions, thereby enabling the shockproofing washer to engage tightly the side wall and avoiding tilting of the pin component, thus enhancing the stability of the shockproofing modules disposed at the side walls.

17 Claims, 4 Drawing Sheets

SHOCKPROOFING MODULE AND ASSEMBLY OF THE SHOCKPROOFING MODULE AND AN ELECTRONIC DEVICE CARRIER CASE

CROSS-REFERENCE TO RELATED APPLICATION

This application claims priority of Taiwanese Application No. 097214570, filed on Aug. 14, 2008.

BACKGROUND OF THE INVENTION

1. Field of the Invention

The present invention relates to a shockproofing module and an assembly of the shockproofing module and an electronic device carrier case, more particularly to a shockproofing module for damping shocks of an electronic device and an assembly of the shockproofing module and an electronic device carrier case for accommodating the electronic device.

2. Description of the Related Art

Referring to FIG. 1, a conventional shockproofing module 1 for installation at a hard drive mounting frame 10 includes a shockproofing washer 11 and a pin component 12. The pin component 12 is connected to the shockproofing washer 11 when the shockproofing washer 11 is formed, and cannot be separated from the shockproofing washer 11. In use, the shockproofing washer 11 is disposed in a respective one of C-shaped holes 101 of the hard drive mounting frame 10 such that one end of the pin component 12 can be extended into a respective one of fastener holes 131 of a hard drive 13, thereby positioning the hard drive 13 on the hard drive mounting frame 10, and achieving a shockproof effect via the shockproofing washer 11.

The aforementioned shockproofing module 1 has been assembled on the hard drive mounting frame 10 prior to delivery. However, because there remains a gap between the shockproofing washer 11 and the inner edge of the hole 101, the shockproofing washer 11 may still move in the hole 101 due to a vibration. The movement of the shockproofing washer 11 will cause the pin component 12 to tilt. When a user intends to assemble the hard drive 13 on the hard drive mounting frame 10, he or she needs to adjust the position of the shockproofing module 1, which results in increased difficulty during assembling. It is also possible that the shockproofing module 1 entirely separates from the hard drive mounting frame 10 due to excessive vibrations during a process of transporting the hard drive mounting frame 10. Therefore, stability of assembly of the shockproofing module 1 on the hard drive mounting frame 10 is not easy to ensure.

The cause of the aforesaid problems is that the shockproofing washer 11 is unable to be positioned relative to the hard drive mounting frame 10. Therefore, as to how the shockproofing washer 11 can be positioned relative to the hard drive mounting frame 10 is a technical aspect to be overcome in the present invention.

SUMMARY OF THE INVENTION

Therefore, an object of the present invention is to provide an assembly of a shockproofing module and an electronic device carrier case. The shockproofing module has relatively good stability and a pin component thereof does not easily tilt when the shockproofing module is disposed at the electronic device carrier case.

Another object of the present invention is to provide a shockproofing module which can enhance the stability of the disposition of a shockproofing washer and which can avoid tilting of a pin component thereof.

Accordingly, an assembly of a shockproofing module and an electronic device carrier case of the present invention comprises an electronic device carrier case and a plurality of shockproofing modules. The electronic device carrier case has two side walls spaced apart from each other. Each of the side walls has an inner side face and is formed with at least one hole. Each of the shockproofing modules is disposed at a respective one of the holes in the side walls and includes a shockproofing washer and a pin component. The shockproofing washer is made of a resilient material and includes a tubular portion and a pad portion. The tubular portion has a first end, a second end, and a segment adjacent to the second end. The pad portion is connected to the first end of the tubular portion and has an opening in spatial communication with the first end of the tubular portion. The tubular portion passes through the respective one of the holes, and the pad portion is disposed at the inner side face of a corresponding one of the side walls when the shockproofing washer is disposed at the respective one of the holes. The pin component has a first end, a second end, and an outer diameter larger than an inner diameter of the segment of the tubular portion. The first end of the pin component projects out of the pad portion, and the pin component abuts against the segment of the tubular portion and causes the second end of the tubular portion to expand in radial directions for engaging tightly the corresponding one of the side walls when the pin component is extended into the tubular portion.

The shockproofing module of the present invention comprises a shockproofing washer and a pin component. The shockproofing washer is made of a resilient material and includes a tubular portion, a pad portion, and a first stop portion. The tubular portion has a first end, a second end, and a segment adjacent to the second end. The pad portion is connected to the first end of the tubular portion and has an opening in spatial communication with the first end of the tubular portion. The first stop portion projects in radial directions from the second end of the tubular portion. The pin component has a first end, a second end, and a second stop portion formed between the first and second ends of the pin component for stopping the pad portion. The pin component has an outer diameter larger than an inner diameter of the segment of the tubular portion.

The first end of the pin component projects out of the pad portion, and the pin component abuts against the segment of the tubular portion and causes the second stop portion to expand in radial directions when the pin component is extended into the tubular portion.

In the present invention, through the cooperative structures of the pin component and the shockproofing washer, the shockproofing washer is able to engage tightly the corresponding side wall via the pin component, and tilting of the pin component can be avoided, thereby enhancing the stability of the dispositions of the shockproofing modules at the side walls.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
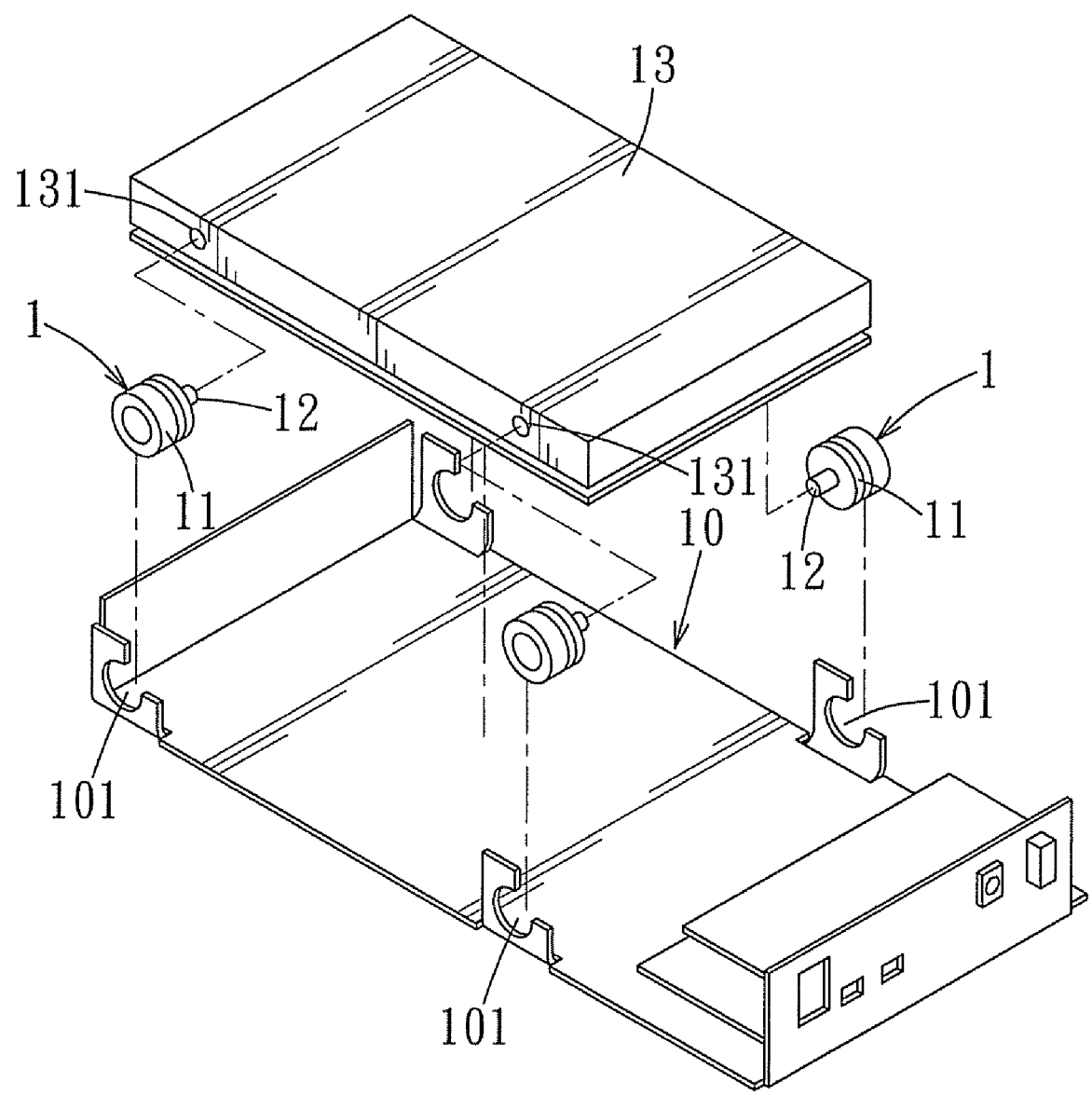
FIG. 1 is an exploded perspective view showing a conventional shockproofing module for installation at a hard drive mounting frame.
Figure 2:
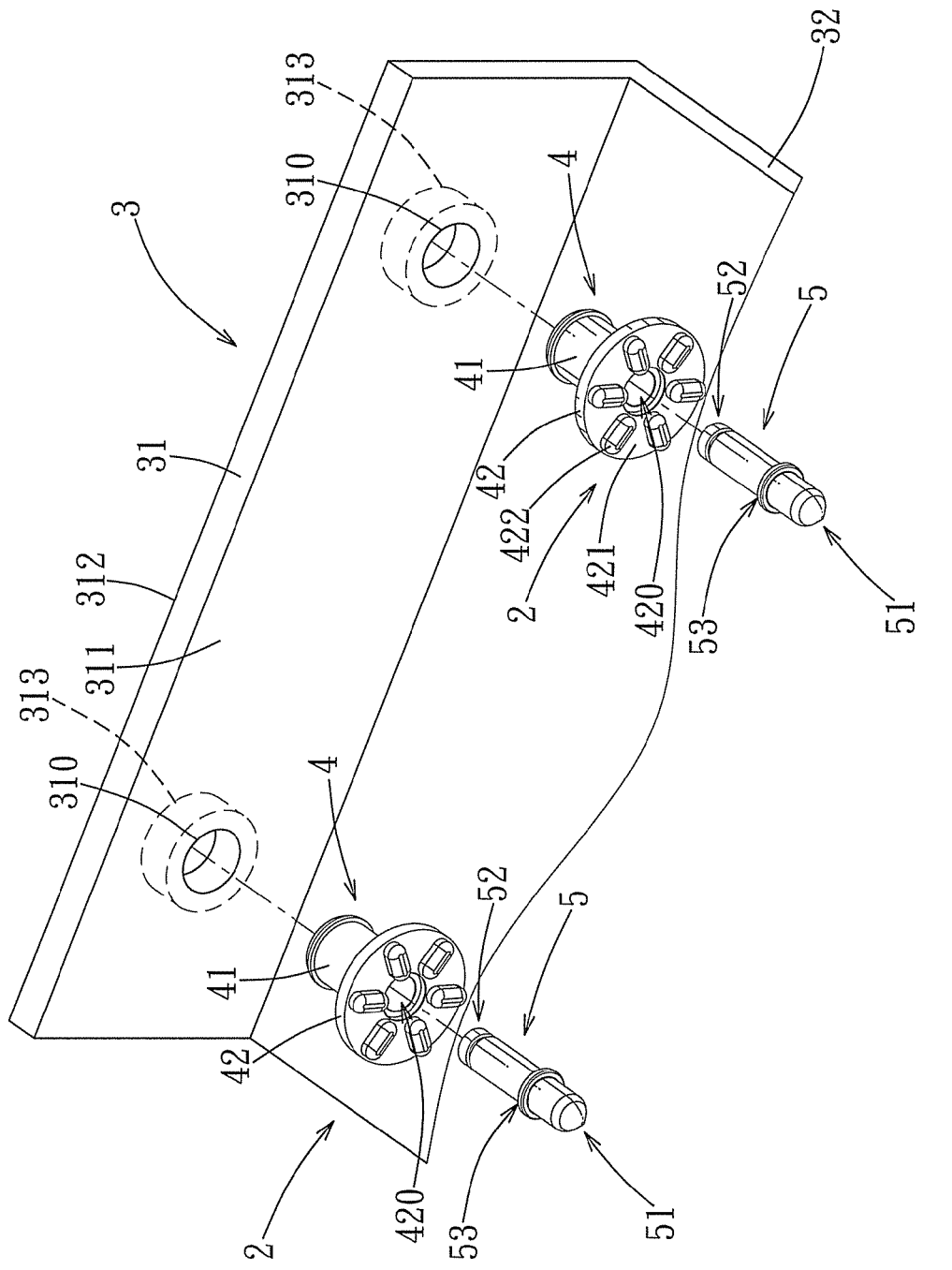
FIG. 2 is an exploded perspective view of a preferred embodiment of an assembly of a shockproofing module and an electronic device carrier case according to the present invention.
Figure 3:
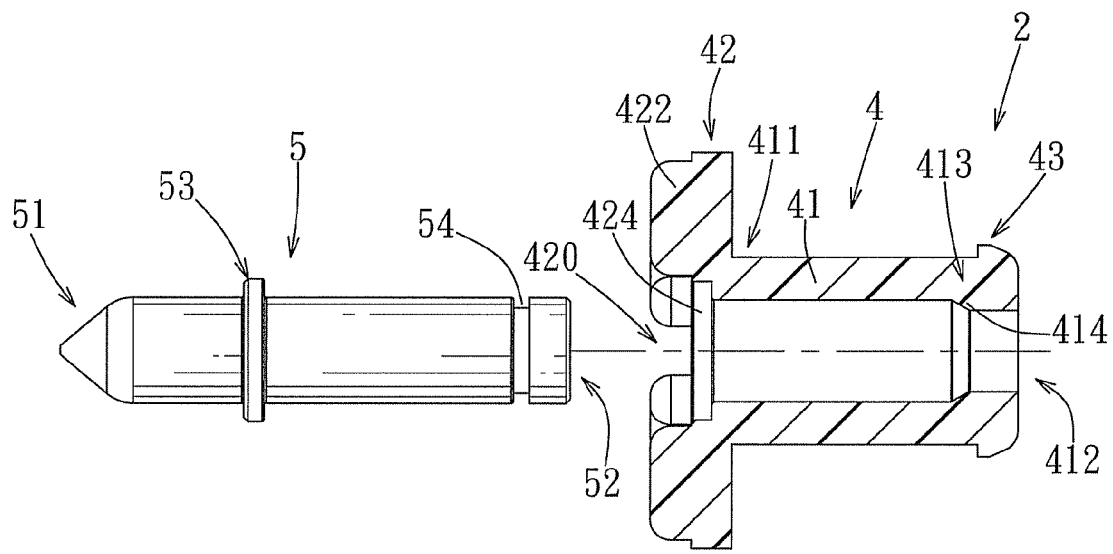
FIG. 3 is an exploded partly sectional view of a shockproofing module of the preferred embodiment.

Referring to FIGS. 2 and 3, the preferred embodiment of an assembly of a shockproofing module and an electronic device carrier case according to the present invention includes a plurality of shockproofing modules 2 and an electronic device carrier case 3.

The electronic device carrier case 3 includes two side walls 31 (only one side wall 31 is shown in FIG. 2) spaced apart from each other, and a bottom wall 32 connected to the side walls 31. An electronic device 6 (see FIG. 5) can be accommodated between the side walls 31. Each of the side walls 31 is formed with at least one hole 310. In this embodiment, the electronic device carrier case 3 can accommodate a hard drive between the side walls 31. Each of the side walls 31 is formed with two holes 310. Each of the holes 310 in the side walls 31 is defined by a hole-defining wall in a form of a closed circular loop. However, the hole-defining wall is not limited to the form of a closed circular loop, and the electronic device 6 can be an optical disk drive, etc. Each of the side walls 31 has an inner side face 311 and an outer side face 312. The inner side faces 311 of the side walls 31 face each other. A tube 313 projects from the outer side face 312 of each of the side walls 31 at a position corresponding to a respective one of the holes 310, and is in spatial communication with the respective one of the holes 310. The number of the shockproofing modules 2 corresponds to the number of the holes 310 in the side walls 31. Each of the shockproofing modules 2 is disposed at a respective one of the holes 310 in the side walls 31 of the electronic device carrier case 3 for positioning the electronic device 6 accommodated between the side walls 31 (see FIG. 5) and damping vibration of the electronic device 6.

Figure 4:
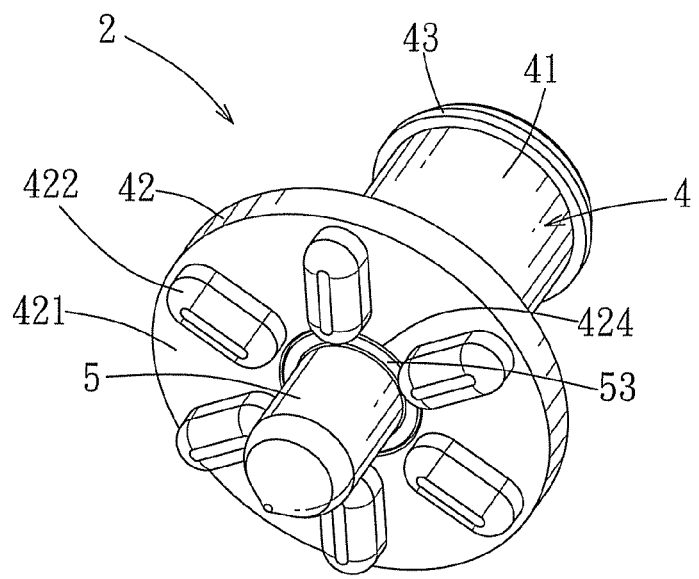
FIG. 4 is a perspective view of a shockproofing washer of the preferred embodiment.

Referring to FIGS. 2 to 4, the shockproofing module 2 includes a shockproofing washer 4 and a pin component 5. The shockproofing washer 4 is made of a resilient material such as rubber, and includes a tubular portion 41 and a pad portion 42. The tubular portion 41 has a first end 411, a second end 412, and a segment 413 adjacent to the second end 412. In this embodiment, the segment 413 has a flange 414 that projects in radial inward directions from a position of an inner wall of the tubular portion 41 adjacent to the second end 412. The flange 414 defines an inner diameter of the segment 413. As shown in FIG. 3, the segment 413 as indicated herein is the part of the tubular portion 41 adjacent to the second end 412, and the inner diameter of this part is smaller than the inner diameter of other parts of the tubular portion 41. The pad portion 42 is connected to the first end 411 of the tubular portion 41 and is in a shape of a ring. The pad portion 42 has an opening 420 in spatial communication with the first end 411 of the tubular portion 41. The opening 420 in the pad portion 42 is defined by an opening-defining wall, and the pad portion 42 further has an insert groove 424 that is indented in radial outward directions from the opening-defining wall. A face 421 of the pad portion 42 opposite to the tubular portion 41 is formed with a plurality of cushioning rib portions 422 projecting therefrom. In this embodiment, the second end 412 of the tubular portion 41 is formed with a first stop portion 43 that projects in radial outward directions, and that is in a shape of a ring with a hook structure. The first stop portion 43 has an outer diameter larger than a diameter of the respective one of the holes 310 in the side walls 31.

The pin component 5 has a first end 51, a second end 52, and a second stop portion 53 formed between the first end 51 and the second end 52 of the pin component 5. In this embodiment, the pin component 5 is further formed with a groove 54 adjacent to the second end 52 of the pin component 5, and the groove 54 is annular in shape. The outer diameter of the pin component 5 is larger than the inner diameter of the segment 413 of the tubular portion 41. The first end 51 of the pin component 5 is in a form of a pointed tip. In this embodiment, the second stop portion 53 is a stop block in a shape of a ring projecting from an outer face of the pin component 5 in radial directions. The second stop portion 53 is adjacent to the first end 51 of the pin component 5, and the groove 54 is adjacent to the second end 52 of the pin component 5.

Figure 5:
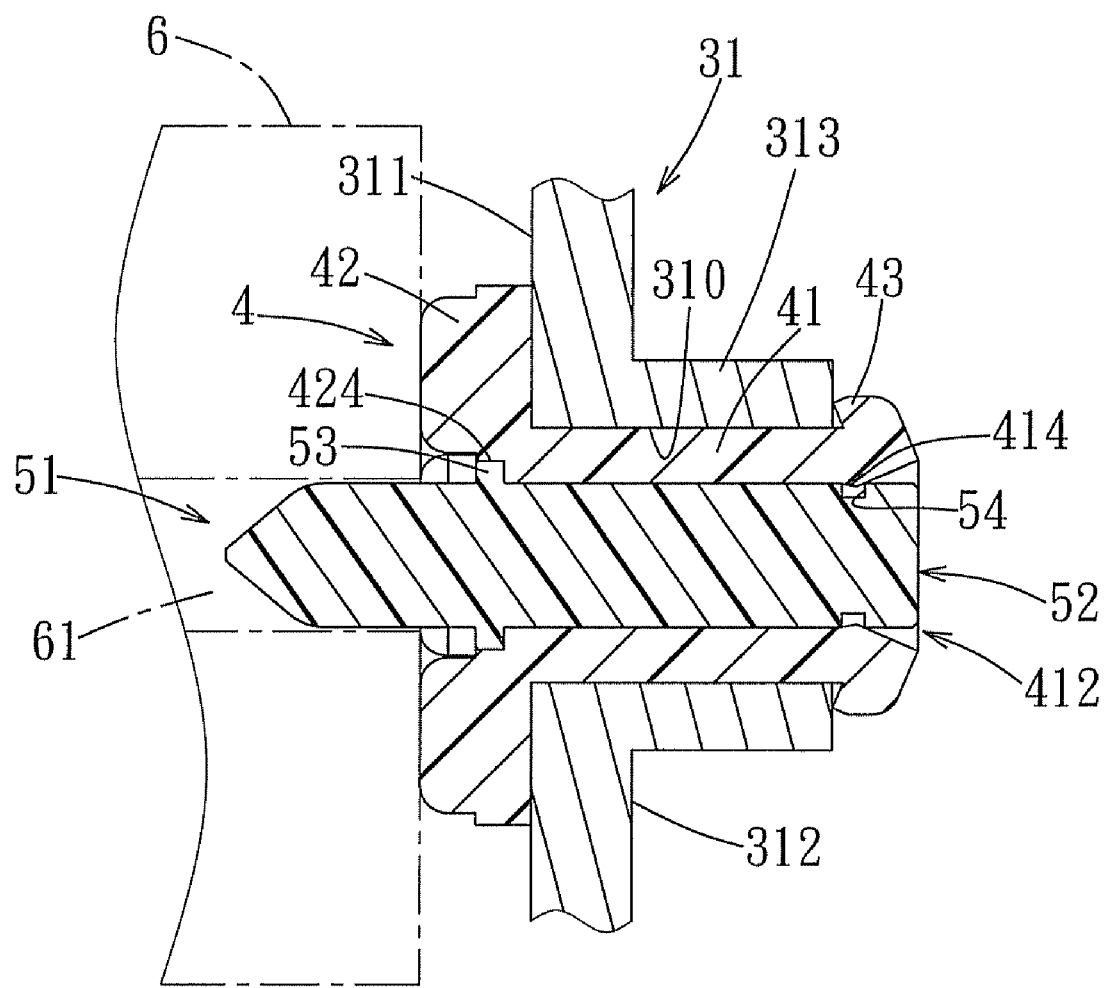
FIG. 5 is a sectional view of the shockproofing module when assembled to the electronic device carrier case.

Referring to FIGS. 3 to 5, when each of the shockproofing modules 2 is disposed at the respective one of the side walls 31 of the electronic device carrier case 3, the shockproofing washer 4 is disposed at the respective one of the holes 310 in the respective side wall 31, and the pin component 5 extends into the tubular portion 41 and the pad portion 42 of the shockproofing washer 4.

When the shockproofing washer 4 is disposed at the respective one of the holes 310 in the respective side wall 31, the tubular portion 41 of the shockproofing washer 4 extends through the hole 310 and the tube 313, the pad portion 42 is at the inner side face 311 of the respective side wall 31 for padding between the electronic device 6 and the respective side wall 31, and the first stop portion 43 abuts against a distal end of the tube 313 on the respective side wall 31.

When the pin component 5 extends into the tubular portion 41 of the shockproofing washer 4 from the opening 420 of the pad portion 42, the first end 51 of the pin component 5 extends out from the pad portion 42 for extension into a fastener hole 61 in a side face of the electronic device 6, thereby positioning the electronic device 6 relative to the side walls 31. The second stop portion 53 of the pin component 5 engages the insert groove 424 of the pad portion 42 and stops the pad portion 42, and the second end 52 of the pin component 5 is disposed at the second end 412 of the tubular portion 41. This time, because the outer diameter of the pin component 5 is larger than the inner diameter of the segment 413, when the second end 52 of the pin component 5 abuts against the segment 413 of the tubular portion 41, the second end 412 of the tubular portion 41, i.e., the first stop portion 43, expands in radial directions for engaging tightly the distal end of the tube 313 on the corresponding one of the side walls 31. Moreover, a part of the flange 414 extends into the groove 54 of the pin component 5.

As mentioned above, when the pin component 5 extends into the tubular portion 41, the pin component 5 abuts against the segment 413 so that the first stop portion 43 expands outwardly and engages tightly the respective one of the side walls 31. Accordingly, the shockproofing washer 4 is able to maintain tight contact with the corresponding one of the side walls 31 and does not easily move relative to the corresponding one of the side walls 31, thereby avoiding tilting of the pin component and separation of the pad portion 42 from the corresponding one of the side walls 31. Therefore, stability of the entire shockproofing module 2 disposed at the corresponding one of the side walls 31 can be enhanced. Moreover, because the segment 413 of the tubular portion 41 is stuffed with the second end 52 of the pin component 5, the vibration of the electronic device 6 can be damped via the shockproofing washer 4 abutting tightly against the pin component 5. In addition, a part of the flange 414 of the segment 413 extends into the groove 54 of the pin component 5, and the second stop portion 53 of the pin component 5 stops the pad portion 42, thereby avoiding an axial movement of the pin component 5 relative to the tubular portion 41. The first end 51 of the pin component 5 is in the form of a pointed tip, so as to easily extend into the corresponding one of the fastener holes 61 in the electronic device 6.

In addition, the electronic device carrier case 3 of this embodiment is formed with the tubes 313 for extending the depths of the holes 310 and for enhancing the stability of the tubular portions 41 of the shockproofing washers 4 when extended into the holes 310. However, in another embodiment, the outer side face 312 of the side wall 31 can be formed without the tubes 313. When the pin component 5 extends into the tubular portion 41 of the shockproofing washer 4, the first stop portion 43 can abut against the outer side face 312 of the side wall 31.

In sum, in the present invention, through the cooperative structures of the pin component 5 and the shockproofing washer 4, the shockproofing washer 4 is able to engage tightly the corresponding one of the side walls 31 via the pin component 5, thereby positioning the shockproofing washer 4 relative to the electronic device carrier case 3 and avoiding tilting of the pin component 5 for enhancing the stability of each of the shockproofing modules 2 disposed at the side walls 31.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An assembly of a shockproofing module and an electronic device carrier case, comprising:
   an electronic device carrier case having two side walls spaced apart from each other, each of said side walls having an inner side face and being formed with at least one hole; and
   a plurality of shockproofing modules, each of which is disposed at a respective one of said holes in said side walls and includes:
      a shockproofing washer made of a resilient material and including
         a tubular portion having a first end, a second end, and a segment adjacent to said second end, and
         a pad portion connected to said first end of said tubular portion and having an opening in spatial communication with said first end of said tubular portion,
         said tubular portion passing through the respective one of said holes, and said pad portion being disposed at said inner side face of a corresponding one of said side walls when said shockproofing washer is disposed at the respective one of said holes; and
      a pin component having a first end and a second end, said pin component having an outer diameter larger than an inner diameter of said segment of said tubular portion,
      said first end of said pin component projecting out of said pad portion, and said pin component abutting against said segment of said tubular portion and causing said second end of said tubular portion to expand in radial directions for engaging tightly the corresponding one of said side walls when said pin component is extended into said tubular portion.

2. The assembly of a shockproofing module and an electronic device carrier case as claimed in claim 1, wherein said segment of said tubular portion has an inner wall and a flange that projects in radial inward directions from said inner wall and that defines the inner diameter of said segment of said tubular portion.

3. The assembly of a shockproofing module and an electronic device carrier case as claimed in claim 2, wherein said second end of said tubular portion is formed with a first stop portion that projects in radial outward directions and that has an outer diameter larger than a diameter of the respective one of said holes.

4. The assembly of a shockproofing module and an electronic device carrier case as claimed in claim 3, wherein said pin component is formed with a groove adjacent to said second end of said pin component, a part of said flange extending into said groove when said pin component is extended into said tubular portion.

5. The assembly of a shockproofing module and an electronic device carrier case as claimed in claim 4, wherein said pin component is formed with a second stop portion between said first and second ends of said pin component, said second stop portion stopping said pad portion when said pin component is extended into said tubular portion and causes said second end of said tubular portion to expand in radial outward directions.

6. The assembly of a shockproofing module and an electronic device carrier case as claimed in claim 5, wherein said second stop portion is a stop block projecting from said pin component.

7. The assembly of a shockproofing module and an electronic device carrier case as claimed in claim 6, wherein said opening in said pad portion is defined by an opening-defining wall, said pad portion further having an insert groove that is indented in radial outward directions from said opening-defining wall, said second stop portion of said pin component engaging said insert groove and stopping said pad portion.

8. The assembly of a shockproofing module and an electronic device carrier case as claimed in claim 7, wherein said first end of said pin component is in a form of a pointed tip.

9. The assembly of a shockproofing module and an electronic device carrier case as claimed in claim 8, wherein said pad portion is in a shape of a ring, and has one face opposite to said tubular portion and formed with a plurality of cushioning rib portions projecting therefrom.

10. The assembly of a shockproofing module and an electronic device carrier case as claimed in claim 9, wherein each of said holes in said side walls is defined by a hole-defining wall in a form of a closed circular loop.

11. A shockproofing module comprising:
    a shockproofing washer made of a resilient material and including
       a tubular portion having a first end, a second end, and a segment adjacent to said second end,
       a pad portion connected to said first end of said tubular portion and having an opening in spatial communication with said first end of said tubular portion, and
       a first stop portion that projects in radial directions from said second end of said tubular portion; and
    a pin component having a first end, a second end, and a second stop portion formed between said first and second ends of said pin component for stopping said pad portion, said pin component having an outer diameter larger than an inner diameter of said segment of said tubular portion;

said first end of said pin component projecting out of said pad portion, and said pin component abutting against said segment of said tubular portion and causing said second stop portion to expand in radial directions when said pin component is extended into said tubular portion.

12. The shockproofing module as claimed in claim 11, wherein said segment of said tubular portion has an inner wall and a flange that projects in radial inward directions from said inner wall and that defines the inner diameter of said segment of said tubular portion.

13. The shockproofing module as claimed in claim 12, wherein said pin component is formed with a groove adjacent to said second end of said pin component, a part of said flange extending into said groove when said pin component is extended into said tubular portion.

14. The shockproofing module as claimed in claim 13, wherein said second stop portion is a stop block projecting from said pin component.

15. The shockproofing module as claimed in claim 14, wherein said opening in said pad portion is defined by an opening-defining wall, said pad portion further having an insert groove that is indented in radial outward directions from said opening-defining wall, said second stop portion of said pin component engaging said insert groove and stopping said pad portion.

16. The shockproofing module as claimed in claim 15, wherein said first end of said pin component is in a form of a pointed tip.

17. The shockproofing module as claimed in claim 16, wherein said pad portion is in a shape of a ring, and has one face opposite to said tubular portion and formed with a plurality of cushioning rib portions projecting therefrom.

* * * * *